United States Patent
Goldscheider

(10) Patent No.: US 7,640,304 B1
(45) Date of Patent: Dec. 29, 2009

(54) SYSTEM AND METHOD FOR DETECTING AND MEASURING EMOTIONAL INDICIA

(75) Inventor: Daniel Goldscheider, Zug (CH)

(73) Assignee: YES International AG, Zug (CH)

( * ) Notice: Subject to any disclaimer, the term of this patent is extended or adjusted under 35 U.S.C. 154(b) by 475 days.

(21) Appl. No.: 11/454,050

(22) Filed: Jun. 14, 2006

(51) Int. Cl.
G06F 15/16 (2006.01)

(52) U.S. Cl. .............. 709/205; 709/204; 709/206; 709/207

(58) Field of Classification Search ........... 709/205
See application file for complete search history.

(56) References Cited

U.S. PATENT DOCUMENTS

| | | | |
|---|---|---|---|
| 7,437,410 B2 * | 10/2008 | Danker et al. ............. 709/204 |
| 2002/0194006 A1 * | 12/2002 | Challapali .................. 704/276 |
| 2003/0069936 A1 * | 4/2003 | Warner et al. ............. 709/206 |
| 2004/0003041 A1 * | 1/2004 | Moore et al. .............. 709/204 |
| 2004/0024822 A1 * | 2/2004 | Werndorfer et al. ........ 709/206 |
| 2005/0216568 A1 * | 9/2005 | Walkush et al. ........... 709/207 |
| 2006/0015560 A1 * | 1/2006 | MacAuley et al. ......... 709/206 |
| 2006/0031375 A1 * | 2/2006 | Danker et al. ............. 709/207 |
| 2006/0059237 A1 * | 3/2006 | Wilcox ..................... 709/206 |
| 2006/0085515 A1 * | 4/2006 | Kurtz et al. ............... 709/207 |
| 2007/0061814 A1 * | 3/2007 | Choi et al. ................. 719/313 |
| 2007/0094330 A1 * | 4/2007 | Russell ..................... 709/206 |
| 2007/0124387 A1 * | 5/2007 | Galloway .................. 709/206 |
| 2007/0266090 A1 * | 11/2007 | Len ......................... 709/204 |

OTHER PUBLICATIONS

Instant Messaging Emoticons, 2002, Microsoft.*
A.F. Rovers, HIM: A Framwork for Haptic Instant messaging, 2004, Eindhoven University of Technology of Netherlands, p. 1- 4.*
"MSN Messenger" printed from the Internet at <Amanda@vision.com (undated).
"Try it out!: (e.g. 3Bubbles.com)" printed from the Internet at http://www.3bubbles.com/ (undated).
"Britney Spears" printed from the Internet at http://www.google.com/reviews?cid+d6a9d9ee5cbfb82b (undated).

* cited by examiner

Primary Examiner—Firmin Backer
Assistant Examiner—Arvin Eskandarnia
(74) Attorney, Agent, or Firm—Brinks Hofer Gilson & Lione

(57) ABSTRACT

A system and method for detecting and measuring emotional indicia in an interactive, real-time communication application. Emotional indicia are preferably emoticons, however, other indicia including words and text can be employed. The real-time interactive communications application is preferably an instant messaging application or a chat room environment. User-conveyed ratings or emotional sentiments are automatically detected and measured to provide an overall rating. Alternatively, an on-going rating can be displayed for a topic currently being discussed or reviewed.

27 Claims, 7 Drawing Sheets

SYSTEM AND METHOD FOR DETECTING AND MEASURING EMOTIONAL INDICIA

BACKGROUND

Chat rooms or other applications are known for use on the Internet and allow online conversations between two users. Some of the best known examples of these applications include AOL Instant Messenger (AIM) and ICQ from America Online Corp. and MSN Messenger from Microsoft Corp. These and similar online chat applications allow two or more users to communicate or converse in real-time (i.e., nearly simultaneously) while each user is logged on to the Internet through a service provider. Both applications use either commonly known browser applications or other dedicated windowing programs to facilitate the online communication between the two users.

An example of a typical chat window is shown in FIG. 1A. Typically, a window 10 is provided that captures the text communications taking place between both users. Text is easily entered in the chat room application in a manner that is similar to an ordinary e-mail communication. The window 10 usually displays the last "x" number of interactions between both users. As is also common in such chat room applications, a window 12 is provided that may identify a particular user's commonly used contacts and/or a user's contacts that are currently online at their computers and available for a real-time communication. Other windows may also be provided for additional features and functions.

A recent development in the known chat room application area is an application allowing for more than two users to communicate in a chat-room fashion. An example of a group chat room application is shown in FIG. 1B. Like the typical chat room application interface shown in FIG. 1A, a dialog window 20 is provided in FIG. 1B. Also like the interface for the typical two-person chat room application, dialog window 20 captures and displays the previous "y" lines of communication between the various users in this group chat room environment.

Another common technique or application existing today on the Internet is the rating function. Rating functions can be inserted and used in multiple different Internet environments, and are commonly employed to solicit and obtain feedback regarding a particular topic or article. One example of a commonly used rating technique is shown in FIG. 1C. As shown in FIG. 1C, topics 30 such as songs, books, or other items are displayed for user access. Access may take on a number of different forms including purchase, reading, listening, review, etc. Embedded within the link identified for the item or topic 30 is a program allowing the user to rate the highlighted item. A rating score 32 is commonly provided alongside the item to indicate users' feedback (either approval or criticism) regarding the topic 30. As is also common, an average rating box 34 may be presented in the user interface. The average rating box 34 typically includes a non-weighted review of all of the other ratings 32 for the particular topics 30 appearing in the interface. In the particular example shown in FIG. 1C, an average rating 34 is provided for the singer "Britney Spears" that is a summation of 103 ratings provided for her songs.

The term "emoticons" has generally been used to describe small icons that are commonly included in e-mail or chat room communications. An example of a common emoticon is the "smiley face" emoticon 40 shown in FIG. 1D. Another common emoticon is a "frown face" emoticon 42. Other such images, whether a still image, or a moving or animated image, are also commonly known and used in electronic communications and messaging. Examples of such communications media include, but are not limited to, e-mail communications, chat room communications, and wireless communication (i.e., text messaging) to name but a few.

It is further known that users of such applications can set the topic of any conversation.

What is lacking is a mechanism that combines a user's desire to rate or provide feedback regarding an item or topic in an interactive real-time communication or conversation. Prior systems and methods for detecting and measuring a user's feedback or rating of a particular topic in a real-time, interactive environment are not known in the art.

BRIEF SUMMARY

In view of the above, a system and method is provided for detecting and measuring emotional indicia in a real-time interactive communication.

According to one aspect, a system is provided that includes a server operative to receive plural communication inputs from plural clients coupled to the server. In the system, the clients are operative to run an application program for receiving input from the user. A communication interface, which is coupled to each of the plural clients and to the server, is provided for transmitting the received user input from the plural clients to the server. At least one indicia of emotion is employed by the user in relation to the interactive communication. Means coupled to the server are included for detecting the at least one indicia of emotion.

According to another aspect, a method is provided for receiving plural communication inputs from plural clients coupled to a server. In the method, the clients are operative to run an application program for receiving input from the user. The received user input is then transmitted from the plural clients to the server. At least one indicia of emotion is provided to be used by the user in the interactive communication. The at least one indicia of emotion provided by the user is then detected according to the method.

In one presently preferred embodiment, a plurality of emoticons are used as the emotional indicia. Each emoticon is assigned a weight in the form of a point score having a positive or negative integer value. Positive point values are assigned to happy emoticons on a scale from neutral up to "happiest," which is assigned the highest positive integer point value. The same is done for negative point values from neutral to "unhappiest." As users employ or insert the various emoticons during the course of an interactive real-time communication, the associated points are tabulated. Preferably, at the conclusion of the conversation, a final point total is provided to express the overall sentiment or rating of the topic discussed. In an alternate embodiment, an ongoing tally is posted to reflect the then-current emotional reaction or rating to the topic under discussion.

These and other features and advantages will be come apparent to those skilled in the art upon a review of the following detailed description of the presently preferred embodiments, taken in conjunction with the appended drawings.

BRIEF DESCRIPTION OF SEVERAL VIEWS OF THE DRAWINGS

FIG. 1 shows some prior art existing applications, where

DETAILED DESCRIPTION OF THE PRESENTLY PREFERRED EMBODIMENTS

Figure 1A:
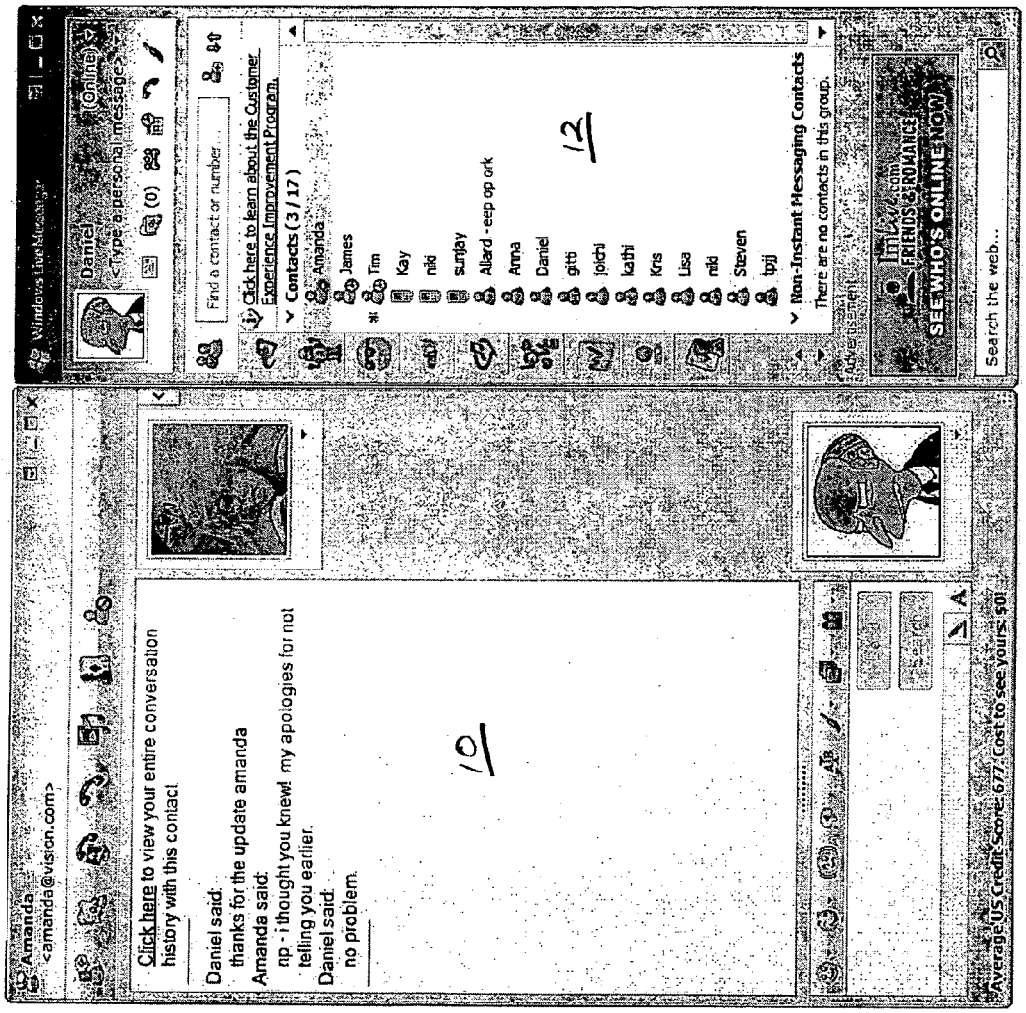
FIG. 1A is a prior art screen shot showing a chat room interface for an instant messenger communication application.
Figure 1B:
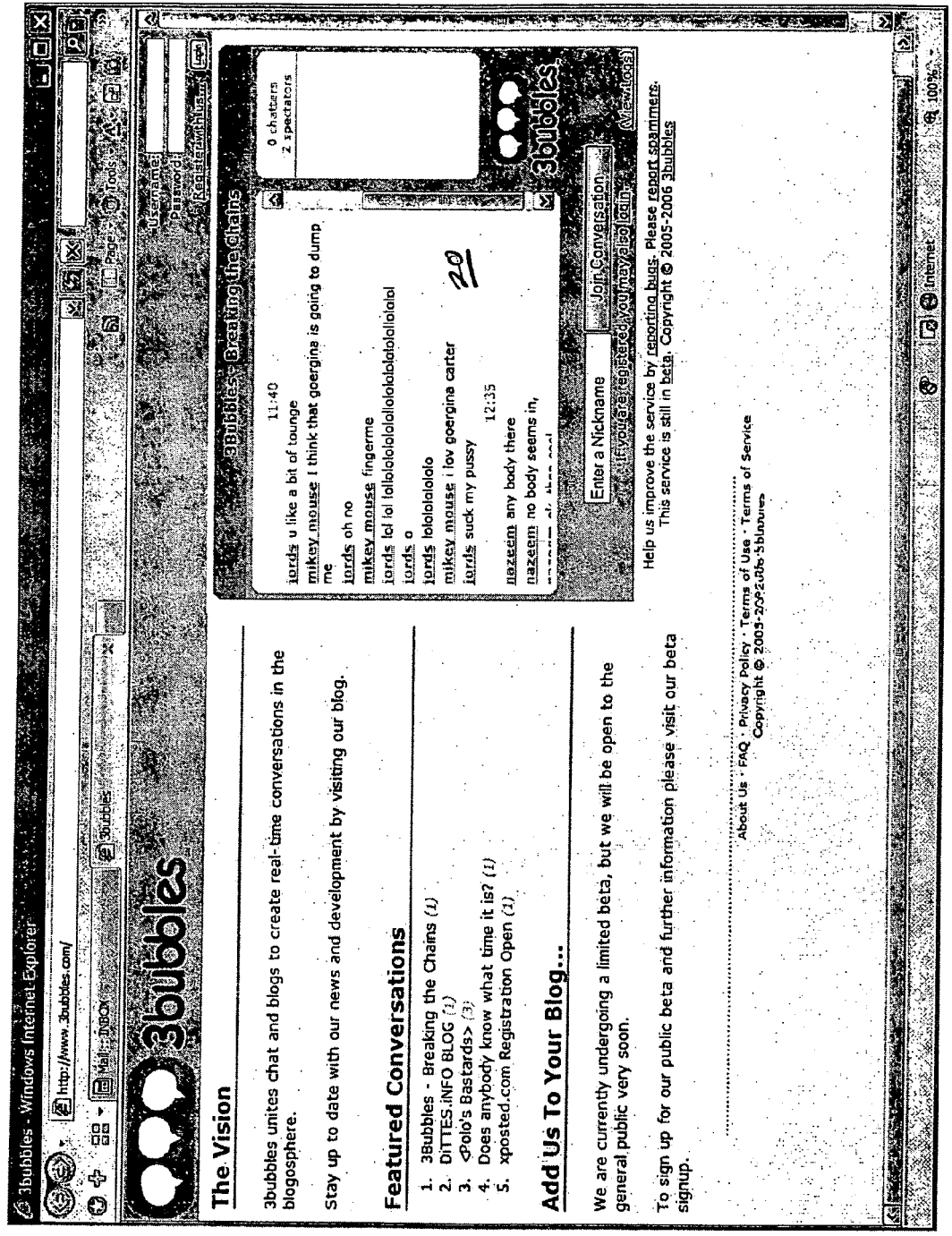
FIG. 1B is a prior art screen shot showing a multi-user chat room interface for a real-time communication application.
Figure 1C:
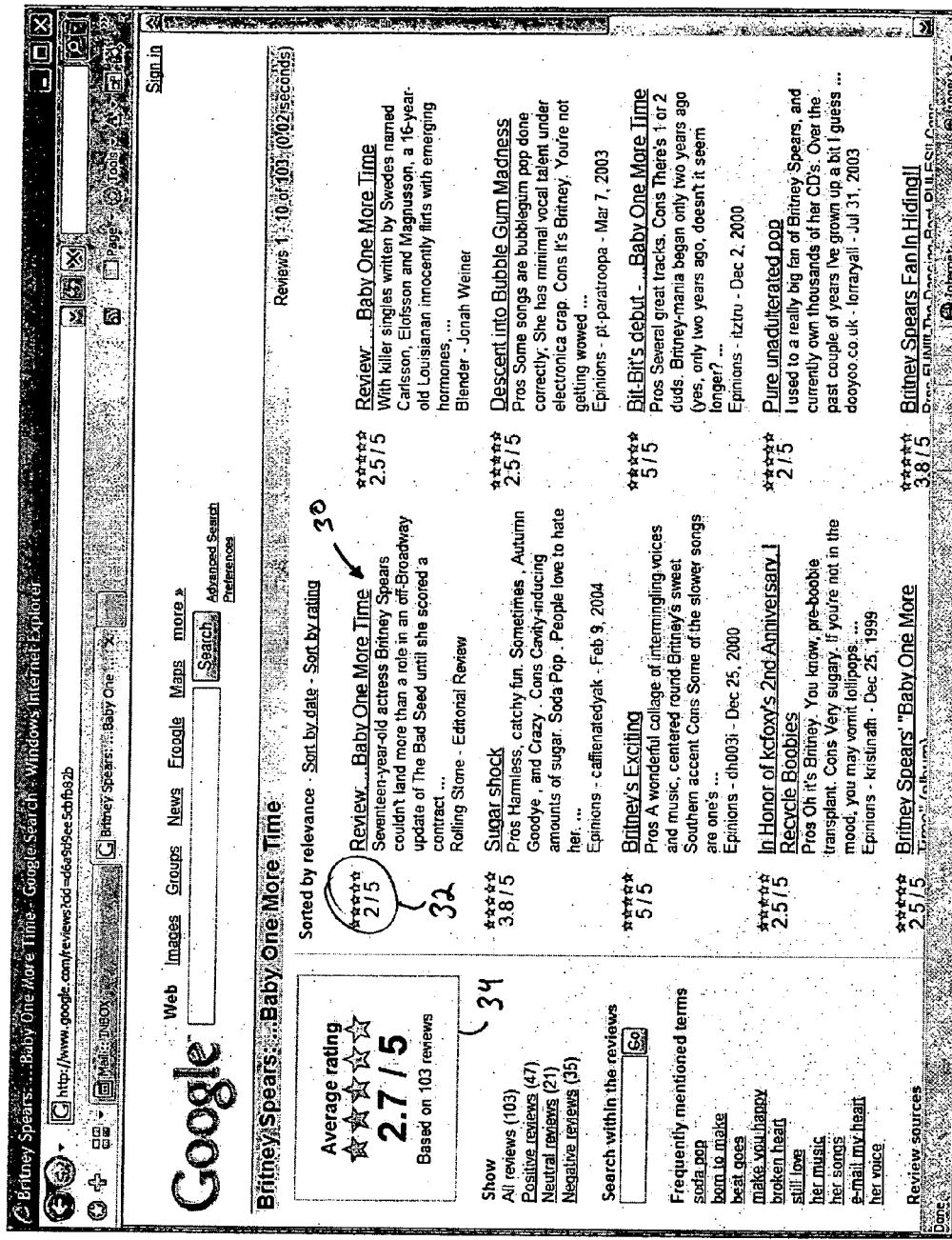
FIG. 1C is a prior art screen shot showing a typical rating interface for a music listing application.
Figure 1D:
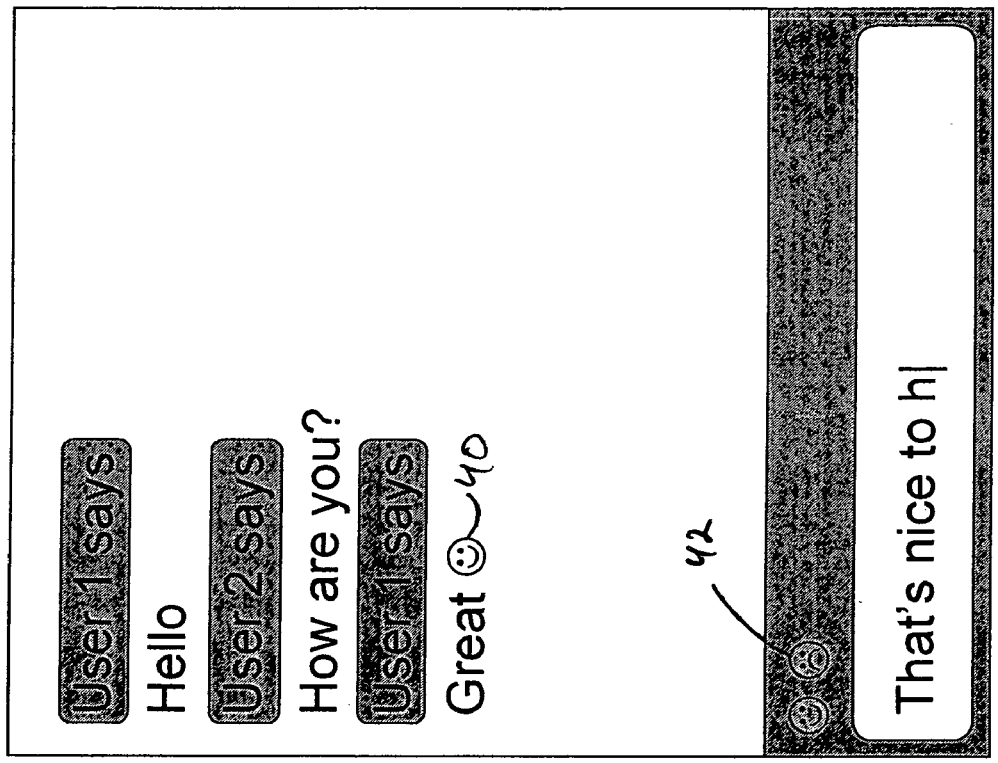
FIG. 1D is a prior art screen shot showing the use of emoticons in the course of an interactive, real-time communication application.
Figure 2:
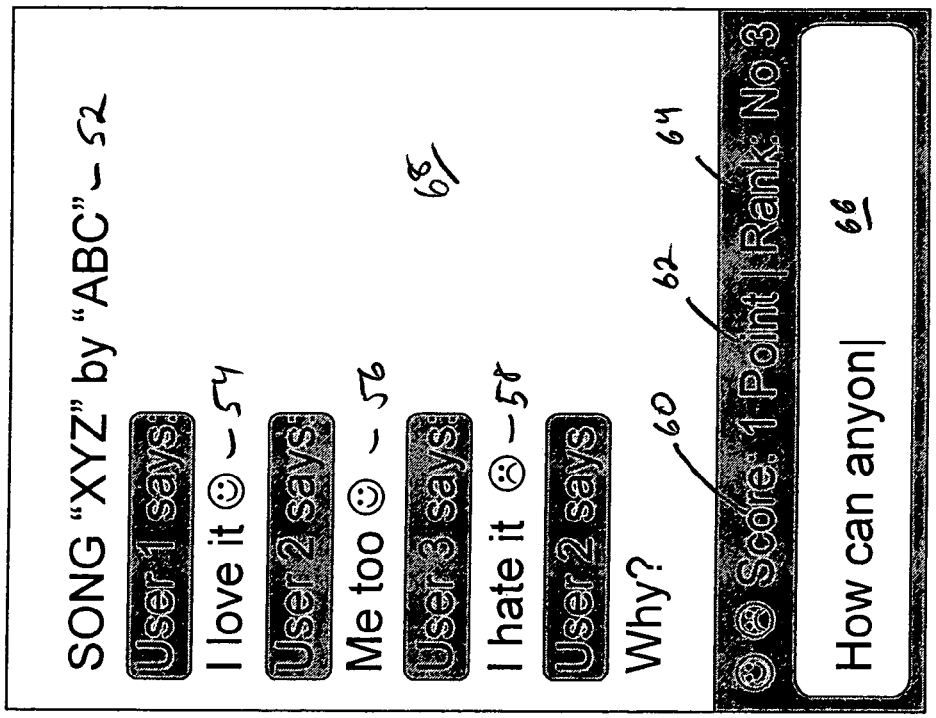
FIG. 2 is a screen shot of a presently preferred interactive, real-time communication application where emoticons are employed to convey ratings of a song.

Referring now to the drawings, where like reference numerals refer to like items throughout, FIG. 2 shows a dialog window appearing in a graphic user interface 50 of an instant messenger communications application. In a manner generally known in the art, a user types text to form sentences or other communications in input window 66. The text is then displayed in a scrolling-like manner in another window 68. Preferably, the last series of exchanges of text between users of this communication application are displayed in the window 68. As can be seen from the example shown in FIG. 2, a topic 52 is generally displayed at the top of window 68. As those skilled in the art will appreciate, the topic 52 can be any content or item of discussion either set by the provider of the service or participants of the conversation. In the example shown, topic 52 is a song by artist "ABC" and the song is entitled "XYZ."

Appearing below the topic 52, the previous "x" lines of text, reflecting the conversation between the plural users, is displayed in window 68. As can be seen from the example, User 1 provides a statement expressing an emotion or rating. In the preferred embodiment shown in FIG. 2, an emoticon is provided by the user to show or illustrate his/her feelings regarding that communication on line 54. Appearing next in a manner generally known in the art, User 2 responds to the statement typed or input by User 1, and also includes an emoticon expressing a rating on line 56. Both of the emoticons shown on 54 and 56 are "smiley face" emoticons generally known in the art. In this case, the emotion or rating expressed by Users 1 and 2 are both positive, and points associated with those emoticons begin to be tabulated automatically in the background. User 3 then provides a response at line 58 using a different emoticon representative of a different feeling or rating. As shown in FIG. 2, the emoticon used by user 3 in line 58 is a "frowning face."

In the preferred embodiment, a display is provided for a score 60, 62 and a rank 64. For the example shown in FIG. 2, the score 60 identified for the series of communications reflected in window 68 is displayed in location 62. Here, the positive ratings identified in lines 54 and 56 were assigned a value of +1 point each. Similarly, the feeling or rating provided in line 58 was assigned a point value of −1. Accordingly, the final score identified in location 62 is an overall +1 point rating (2 positive votes, 1 negative vote). A ranking can also be provided, as shown in location 64.

Figure 3:
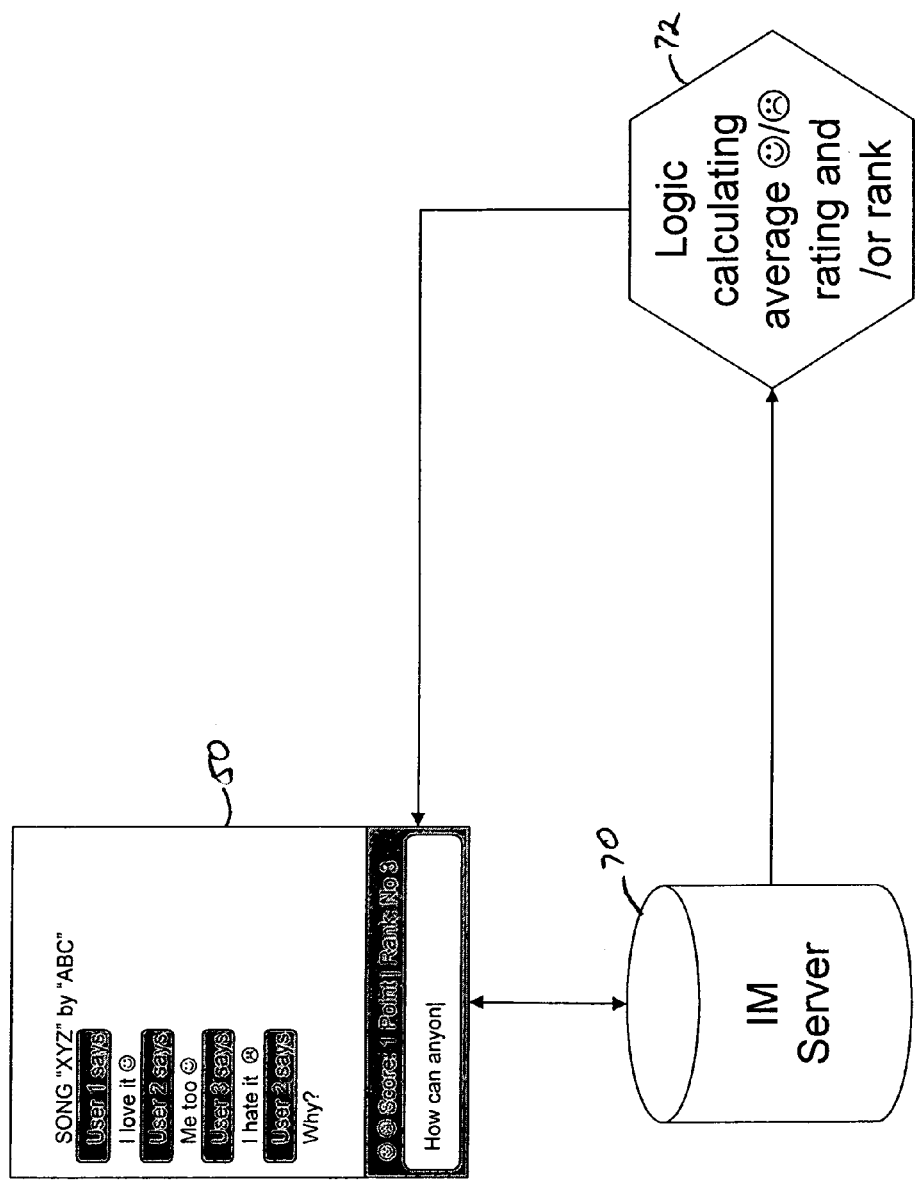
FIG. 3 is a functional block diagram of one presently preferred system for detecting and measuring emotional indicia.

Turning now to FIG. 3, the graphical user interface 50 identified in FIG. 2 is used to represent a user device (not shown). As those skilled in the art will appreciate, the user device (not shown) can take on a multitude of forms including, but not limited to, PDA's, computer displays, lap-top computers, computer terminals, and telecommunications devices. The graphical user interface 50 is, therefore, shown in FIG. 3 in a representative manner to identify the user end of the system generally shown. In the preferred embodiment, the user device (not shown) will typically be a client computer operating in a known client-server communication network environment. Accordingly, an instant messenger server 70 is shown in FIG. 3 as being coupled to the user device (not shown) displaying the graphical user interface 50. As can be seen, bidirectional communications take place between the graphical user interface 50 and the instant messenger server 70. The instant messenger 70 can take on any generally known server configuration for messaging such as the examples identified above for America Online, Microsoft, and 3Bubbles. No further description need be provided regarding the instant messenger server 70.

As can also be seen in FIG. 3, logic 72 is provided to perform the detecting, measuring, and/or calculating of the average rating or ranking described herein. The logic 72 can either be incorporated as part of the client providing the graphical user interface 50, as part of the instant messaging server 70, or as stand-alone logic.

Figure 4:
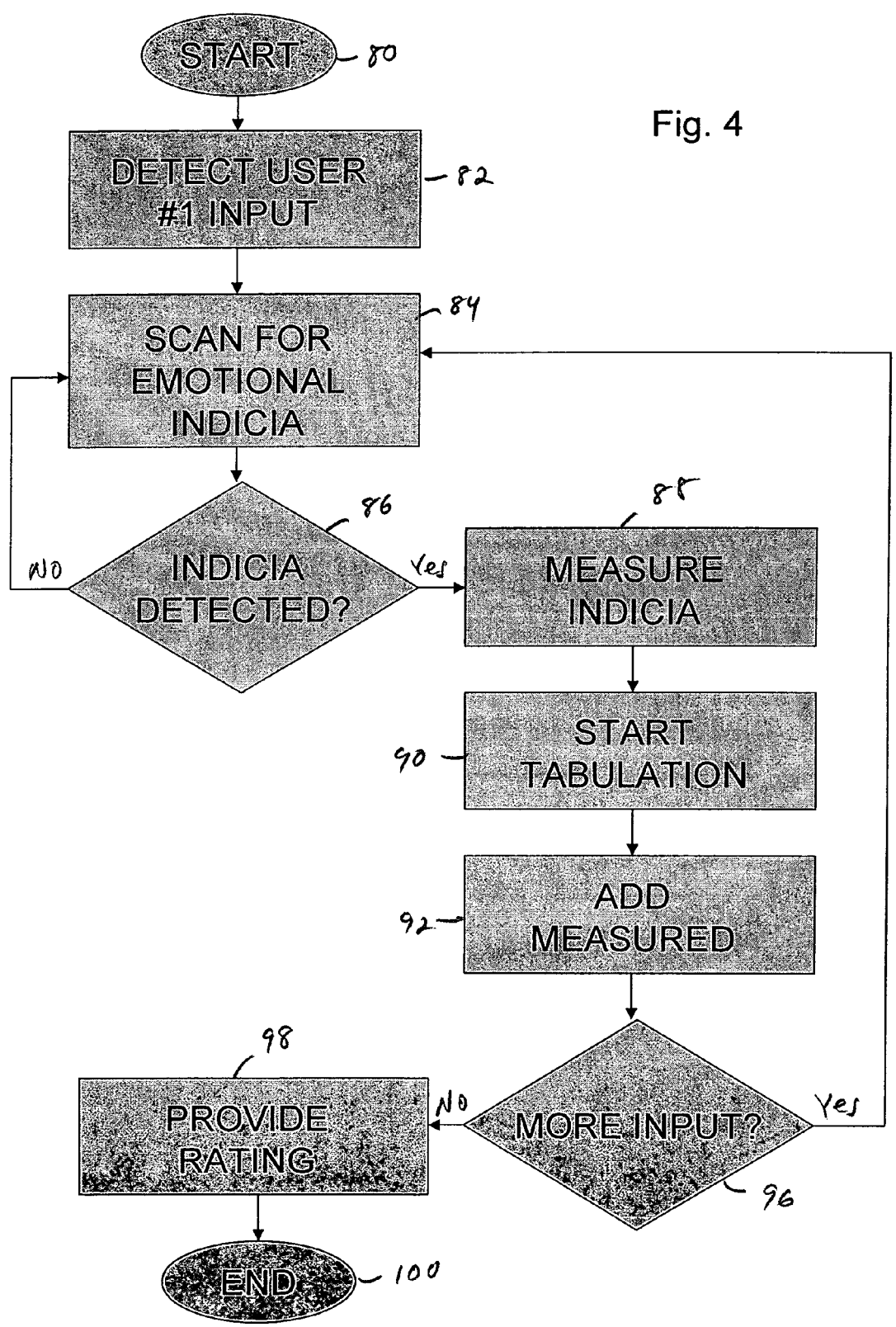
FIG. 4 is a flow chart showing the process of calculating an average rating or rank, as indicated in FIG. 3.

Turning now to FIG. 4, a flow chart of the functionality of the logic 72 illustrated in FIG. 3 is provided. In the presently preferred embodiment, the logic exists in the form of computer software; however, those skilled in the art will appreciate that the functions identified in FIG. 4 can also be implemented solely in hardware or as a combination of hardware and software without departing from the essential scope described herein. In the preferred embodiment of a computer software program, the program starts at box 80, and in box 82 waits for the detection of input from User 1. Once input is detected, a scan of the input is performed for the detection of emotional indicia at box 84. Emotional indicia can take on any number of forms within the scope of this disclosure. In the presently preferred embodiment, the emotional indicia comprises emoticons as shown in FIGS. 1-3. However, those skilled in the art will appreciate that other indicia including, but not limited to, text and words can be used to describe emotional feelings, ranking, and/or ratings. If text is being used, known word indexing and analysis programs can be used to identify words reflective of emotional expressions or content. At box 86, a test is performed to determine if emotional indicia has been detected. If not, the program loops back to box 84.

If emotional indicia is detected, program flow moves to box 88. In box 88, the program measures the emotional expressiveness of the detected indicia. As described in connection with FIG. 2, a simple point system can be assigned to reflect smiling and frowning face emoticons 40, 42. It is contemplated, however, that a broad spectrum of points ranging from high to low can be employed and measured by the program at box 88. Based on the detected indicia for User 1, a point or score tabulation is started in box 90. The measured point value or scale is added to the tabulation at box 92, and a test is performed at box 96 to determine if additional user input is being provided. If so, the program loops back to box 84 to scan for and capture additional emotional indicia. If not, the program proceeds to box 98 to provide a rating or ranking of the final point total.

Preferably, the rating or ranking is provided in a graphical user interface in a manner described above in connection with FIGS. 1-3. Also preferably, the rating or ranking is provided at the conclusion of a communication sequence or conversation. Alternatively, the rating or ranking can be provided in an ongoing manner during the course of a communication sequence to identify to the users the present "temperature" of the emotional aspects of that conversation, such as the rating or ranking of specific content. The program concludes at box 100.

It is to be appreciated that a wide range of changes and modifications to the above examples of the best modes for carrying out the invention are contemplated without departing from the essential spirit and scope of the invention. It is therefore intended that the foregoing detailed description be regarded as illustrative rather than limiting, and that it be understood that it is the following claims, including all equivalents, that are intended to define the spirit and scope of this invention.

I claim:

1. A system comprising:
   (a) means for detecting and capturing an emotional content in real time in an interactive communication environment;
   (b) means for translating the emotional content into a score representative of the emotional expressiveness of the interactive communication; and
   (c) means for displaying an indication of the score in the interactive communication environment, where in the score comprises of a numerical value.

2. A method comprising:
   detecting and capturing, by a server, an emotional content in real time in an interactive communication environment;
   translating, by the server, the emotional content into a score representative of the emotional expressiveness of the interactive communication; and
   displaying, by a user device in the interactive communication environment, an indication of the score, where in the score comprises of a numerical value.

3. A system for monitoring an interactive communication in real time, comprising:
   a server operative to receive plural communication inputs from plural user devices coupled to the server, the user devices operative to run an application program for receiving input from plural;
   a communication interface, coupled to each of the plural user devices and to the server, for transmitting the received user input from the plural user devices the server and for transmitting a score related to the received user input to the plural clients;
   means coupled to the server for detecting the at least one indicia of emotion provided by one of the plural users in relation to the interactive communication;
   means coupled to the server for translating the at least one indicia of emotion into the score, wherein the score is representative of an emotional expressiveness of the interactive communication; and
   means coupled to the plural user devices for displaying an indication of the score, where in the score comprises of a numerical value.

4. The system identified in claim 3, wherein the communication interface further transmits the received user input to other of the plural user devices.

5. The system identified in claim 3, further comprising means for storing the detected at least one indicia of emotion.

6. The system identified in claim 3, further comprising means for communicating the detected at least one indicia of emotion.

7. The system identified in claim 3, further comprising means for measuring the detected at least one indicia of emotion.

8. A computer implemented method for monitoring an interactive communication in real time, comprising:
   receiving, through plural user devices coupled to a server, a plural communication inputs from the plural user devices, each user device operative to run an application program for receiving input from user;
   transmitting, through a communication interface, the received user input from the plural user devices to the server;
   providing, by at least one user device, at least one indicia of emotion used by the user in the interactive communication;
   detecting, by the server, the at least one indicia of emotion provided by the user;
   translating, by the server, the at least one indicia of emotion into a score representative of an emotional expressiveness of the interactive communication; and
   displaying, by the plural user devices, an indication of the score, where in the score comprises of a numerical value.

9. The method identified in claim 8, further comprising transmitting, through the communication interface, the received user input to other of the plural user devices.

10. The method identified in claim 8, further comprising storing, by the server, the detected at least one indicia of emotion.

11. The method identified in claim 8, further comprising communicating, through the communication interface, the detected at least one indicia of emotion to the other of the plural user devices.

12. The method identified in claim 8, further comprising displaying, by the plural user devices, a ranking of the score.

13. The method identified in claim 8, further comprising measuring, by the server, the detected at least one indicia of emotion.

14. A system for allowing interactive real time communication between plural users in a client/server environment, comprising:
   plural user devices client the user devices each coupled to a server and operative to communicate input received from a user;
   means, coupled to the server and plural user devices client for executing an email chat routine operative to allow users to communicate interactively and in real time, the interactive chat routine configured to provide emoticons for use by a user to include in an interactive communication;
   means for detecting and translating emoticons communicated over the system into a score reflective of a topic of the interactive communication; and
   means for displaying an indication of the score on the plural user devices, where in the score comprises of a numerical value.

15. The system defined in claim 14, wherein the emoticons comprise a smiling face.

16. The system defined in claim 14, wherein the emoticons comprise a frowning face.

17. The system defined in claim 15, wherein the smiling face emoticon is assigned a positive point score.

18. The system defined in claim 16, wherein the frowning face emoticon is assigned a negative point score.

19. The system defined in claim 14, wherein the emoticons are assigned a point score that is added at the end of an interactive communication to yield a total point score associated with the topic of the communication.

20. The system defined in claim 14, wherein the emoticons are assigned a point score that is added in real time as they are provided by a user in an interactive communication to yield an on-going point score associated with the topic of the communication.

21. A computer implemented method for allowing interactive real time communication between plural users in a client/server environment, comprising:

identifying, by a server, plural user devices client the user devices each coupled to the server and operative to communicate input received from a user;

executing, by the server, an email chat routine operative to allow users to communicate interactively and in real time, the interactive chat routine configured to provide emoticons for use by a user to include in an interactive communication;

detecting and translating, by the server, emoticons communicated over the system into a score reflective of a topic of the interactive communication; and displaying, by the plural user devices, an indication of the score, where in the score comprises of a numerical value.

22. The method defined in claim 21, further comprising providing, by at least one user device, a smiling face emoticon.

23. The method defined in claim 21, further comprising providing, by at least one user device, a frowning face emoticon.

24. The method defined in claim 22, further comprising assigning, by the server, the smiling face emoticon a positive point score.

25. The method defined in claim 23, further comprising assigning, by the server, the frowning face emoticon a negative point score.

26. The method defined in claim 21, further comprising adding, by the server, the point scores for emoticons at the end of an interactive communication to yield a total point score associated with the topic of the communication.

27. The method defined in claim 21, further comprising adding, by the server, the point scores for emoticons in real time as they are provided by a user in an interactive communication to yield an on-going point score associated with the topic of the communication.

* * * * *

UNITED STATES PATENT AND TRADEMARK OFFICE
CERTIFICATE OF CORRECTION

PATENT NO. : 7,640,304 B1
APPLICATION NO. : 11/454050
DATED : December 29, 2009
INVENTOR(S) : Daniel Goldscheider Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 673 days.

Signed and Sealed this

Ninth Day of November, 2010

David J. Kappos
*Director of the United States Patent and Trademark Office*